(12) United States Patent
Li et al.

(10) Patent No.: US 9,979,746 B2
(45) Date of Patent: May 22, 2018

(54) METHOD AND APPARATUS FOR DETECTING HIDDEN CONTENT OF WEB PAGE

(71) Applicant: TENCENT TECHNOLOGY (SHENZHEN) COMPANY LIMITED, Shenzhen (CN)

(72) Inventors: Yongjian Li, Shenzhen (CN); Jiwen Zhou, Shenzhen (CN); Yang Yu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 105 days.

(21) Appl. No.: 14/688,314

(22) Filed: Apr. 16, 2015

(65) Prior Publication Data
US 2015/0222660 A1    Aug. 6, 2015

Related U.S. Application Data

(63) Continuation of application No. PCT/CN2013/085367, filed on Oct. 17, 2013.

(30) Foreign Application Priority Data

Oct. 18, 2012 (CN) .......................... 2012 1 0397725

(51) Int. Cl.
*H04L 29/06* (2006.01)
*G06F 17/30* (2006.01)
*H04L 29/08* (2006.01)

(52) U.S. Cl.
CPC ...... *H04L 63/1466* (2013.01); *G06F 17/3089* (2013.01); *G06F 17/30876* (2013.01); *H04L 67/02* (2013.01)

(58) Field of Classification Search
CPC ....... H04L 67/02; G06F 21/53; G06F 21/566; G06F 17/30861; G06F 17/30864
See application file for complete search history.

(56) References Cited

U.S. PATENT DOCUMENTS

| | | | |
|---|---|---|---|
| 8,505,094 B1* | 8/2013 | Xuewen | H04L 63/1416 707/687 |
| 8,639,680 B1* | 1/2014 | Ciccolo | G06F 17/30867 707/705 |
| 9,398,032 B1* | 7/2016 | Wan | G06F 21/566 |
| 2002/0169875 A1* | 11/2002 | Furui | G06F 17/30864 709/225 |
| 2003/0159063 A1* | 8/2003 | Apfelbaum | G06F 21/577 726/25 |

(Continued)

FOREIGN PATENT DOCUMENTS

| CN | 102346770 A | 2/2012 |
|---|---|---|
| CN | 102375851 A | 3/2012 |

(Continued)

OTHER PUBLICATIONS

Chellapilla et al., Improving Cloaking Detection Using Search Query Popularity and Monetizability, Aug. 10, 2006, AirWeb 2006, 8 Pages.*

(Continued)

*Primary Examiner* — Farid Homayounmehr
*Assistant Examiner* — Christopher C Harris
(74) *Attorney, Agent, or Firm* — Knobbe Martens Olson & Bear LLP

(57) ABSTRACT

According to an example, a web page is loaded and description information of the web page and layout information of the web page are generated, the description information of the web page is compared with the layout information of the web page, whether all tag nodes comprised in the description information of the web page are comprised in the layout information of the web page is determined, and it is determined at least one tag node, which being comprised in the description information of the web page and not contained in the layout information of the web page, as hidden content.

8 Claims, 3 Drawing Sheets

(56) References Cited

U.S. PATENT DOCUMENTS

| | | | |
|---|---|---|---|
| 2006/0075500 A1* | 4/2006 | Bertman | G06F 21/563 726/24 |
| 2008/0010683 A1* | 1/2008 | Baddour | G06F 17/30864 726/24 |
| 2008/0307328 A1 | 12/2008 | Hatcher et al. | |
| 2010/0114902 A1 | 5/2010 | Embley et al. | |
| 2011/0119571 A1 | 5/2011 | Decker et al. | |
| 2011/0252478 A1* | 10/2011 | Hubbard | G06F 17/30864 726/24 |
| 2012/0255027 A1 | 10/2012 | Kanakapura et al. | |
| 2013/0073946 A1 | 5/2013 | Kang et al. | |

FOREIGN PATENT DOCUMENTS

| | | |
|---|---|---|
| CN | 102508887 A | 6/2012 |
| CN | 102542201 A | 7/2012 |
| CN | 102622543 A | 8/2012 |
| CN | 102682097 A | 9/2012 |
| EP | 1 406 183 A2 | 4/2004 |
| WO | WO 2009/049275 A1 | 4/2009 |

OTHER PUBLICATIONS

Office Action Issued in Chinese Patent Application No. 201210397725.X, dated Sep. 28, 2014.
Office Action Issued in Chinese Patent Application No. 201210397725.X, dated Jan. 4, 2015.
International Preliminary Report for International Application No. PCT/CN2013/085367, dated Apr. 30, 2015, in 5 pages.
International Search Report for International Application No. PCT/CN2013/085367, dated Jan. 16, 2014.

* cited by examiner

METHOD AND APPARATUS FOR DETECTING HIDDEN CONTENT OF WEB PAGE

CROSS-REFERENCE TO RELATED APPLICATIONS

This application is continuation of international application No. PCT/CN2013/085367, filed on Oct. 17, 2013, which claims the benefit of Chinese Patent Application, No. 201210397725.X, filed on Oct. 18, 2012, the contents of both of which are hereby incorporated by reference in their entireties.

FIELD

The present invention relates to communication technologies, more particularly to, a method and apparatus for detecting hidden content of a web page.

BACKGROUND

Currently, when hanging a hidden chain which is also called a black chain, a hacker always configures an attribute of a Hypertext Markup Language (HTML) tag as display: none, by using many modes. For example, the hacker may configure in the HTML, configure in a Cascading Style Sheet (CSS) file via a CSS selector, or configure property settings of a web page node via JavaScript which is a programming language.

When hanging the hidden chain, the hacker modifies page content of a normal website. Hidden links pointing to other websites are added in a normal web page, and thus the number of external links of a target website is improved. The external link is a link pointing to a Uniform/Universal Resource Locator (URL) under a nonlocal domain name. The hung hidden chain is hidden content of the web page. Traditional detection modes are as follows.

In a static detection mode, the HTML, CSS and JavaScript commonly used by the hacker are collected, general text string characteristics are extracted, and the general text string characteristics are used to detect the hidden chain in the web page.

In a dynamic detection mode, JavaScript codes of the web page are executed by using an open source JavaScript engine, if it is found that executed codes has a function of hiding external links, it is determined that the page is hung with the hidden chain.

SUMMARY

The examples of the present invention provide a method and apparatus for detecting hidden content of a web page.

A method for detecting hidden content of a web page includes:

loading a web page;

generating description information of the web page, the description information of the web page comprising first tag nodes;

generating layout information of the web page, the layout information of the web page comprising second tag nodes, the second tag nodes not having a hidden state;

comparing the description information of the web page with the layout information of the web page to determine whether the layout information of the web page comprises all of the first tag nodes; and determining at least one of the first tag nodes, not being comprised in the layout information of the web page, as hidden content.

An apparatus for detecting hidden content of a web page includes:

a loading unit, configured to load a web page, generate description information of the web page, the description information of the web page comprising first tag nodes, and generate layout information of the web page, the layout information of the web page comprising second tag nodes, the second tag nodes not having a hidden state;

a comparing unit, configured to compare the description information of the web page with the layout information of the web page to determine whether the layout information of the web page comprises all of the first tag nodes; and a content determining unit, configured to determine at least one of the first tag nodes, not being comprised in the layout information of the web page, as hidden content.

A device, comprises a memory, and one or more programs stored in the memory and configured for execution by one or more processors, the one or more programs including instructions to:

load a web page;

generate description information of the web page, the description information of the web page comprising first tag nodes;

generate layout information of the web page, the layout information of the web page comprising second tag nodes, the second tag node not having a hidden state;

compare the description information of the web page with the layout information of the web page to determine whether the layout information of the web page comprises all of the first tag nodes; and determine at least one of the first tag nodes, not being comprised in the layout information of the web page, as hidden content.

DETAILED DESCRIPTION

Figure 1:
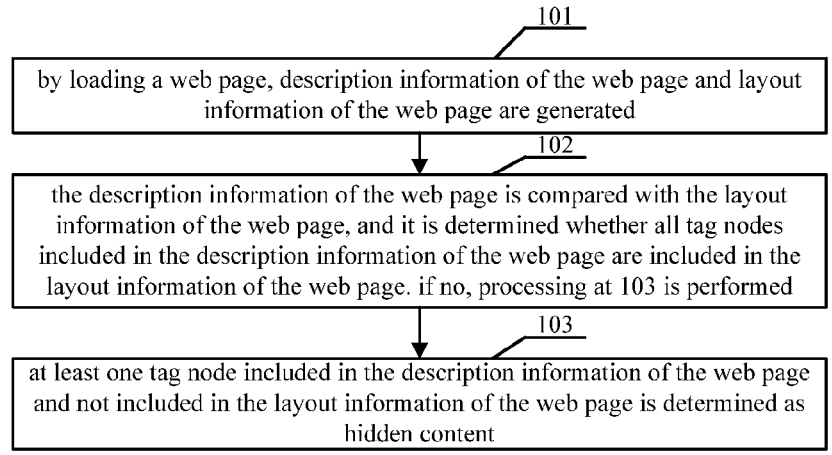
FIG. 1 is a schematic flowchart illustrating a method for detecting hidden content of a web page according to various examples of the present invention.

About the method for detecting the hidden content, because various hidden link codes may be generated by combining the HTML, CSS, and JavaScript, and the JavaScript as a front programming language may encrypt malicious code, it is easy to bypass the static detection. The hidden codes encrypted by the JavaScript may be detected by using the dynamic detection, but no processing is performed for the CSS and HTML, so that the web page with the hidden content added by using a deformation HTML+CSS mode cannot be recognized. Therefore, accuracy rate of detecting the hidden content by using each of the two detection modes is not high.

The examples of the present application provide the following technical solutions.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the various embodiments in conjunction with the accompanying drawings in FIGS. 1-5. It should be understood that specific embodiments described herein are merely intended to explain the present disclosure, but not intended to limit the present disclosure. In accordance with the purposes of this disclosure, as embodied and broadly described herein, this disclosure, in one aspect, relates to method and apparatus for detecting hidden content of a web page.

Examples of mobile terminals that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to one skilled in the art.

FIG. 1 is a schematic flowchart illustrating a method for detecting hidden content of a web page according to various examples of the present invention. As shown in FIG. 1, the method includes the following processing.

At 101, by loading a web page, description information of the web page and layout information of the web page are generated.

According to an example, the web page is loaded by using a layout engine, and before loading the web page by using the layout engine, a user-agent character string of the layout engine is configured as a search engine.

Currently, many hackers determine whether a web page is visited by a common user or by a search engine crawler according to the user-agent. The hacker only returns a page with Search Engine Optimization (SEO) to the search engine crawler, and returns normal content to the common user. It is different for network managers to detect abnormal states of the web site. According to the example, when the user-agent of the layout engine is configured as the search engine, the above problem is solved, and accuracy of detecting the hidden content of the web page is further improved.

When the web page is loaded by using the layout engine, a Uniform/Universal Resource Locator (URL) is loaded by using the layout engine, returned HTML codes are parsed, and other elements in a page corresponding to the returned HTML codes are loaded. The other elements may be CSS, JavaScript and etc., which is not limited in the examples of the present invention.

According to an example, the layout engine is an open-source browser layout engine, e.g. a webkit, the description information of the web page is a Document Object Model (DOM) tree; the layout information of the web page is a render tree. It should be noted that, the layout engine is a tool for configuring the layout of the web page and is not limited to the webkit according to various examples. Similarly, according to various examples, the description information and the layout information are not limited to the DOM tree and the render tree respectively.

Accordingly, at 101, the web page is loaded by using the webkit, and the DOM tree and the render tree are generated.

At 102, the description information of the web page is compared with the layout information of the web page, and it is determined whether all tag nodes included in the description information of the web page are included in the layout information of the web page.

If not all tag nodes included in the description information of the web page are included in the layout information of the web page, processing at 103 is performed.

If all tag nodes included in the description information of the web page are included in the layout information of the web page, it indicates that the web page does not have hidden content, and the procedure is terminated.

According to an example, at 102, when the layout engine is the webkit, the description information of the web page is the DOM tree, and the layout information of the web page is the render tree, the DOM tree is compared with the render tree and it is determined whether all tag nodes included in the DOM tree are included in the render tree.

Further, the description information of the web page is compared with the layout information of the web page, after the description information of the web page and the layout information of the web page are generated and a preset delay time period expires.

According to an example, the preset delay time period may be configured according to time period needed for e.g. loading the web page, such as 5 second, which is not limited in the examples of the present application.

At 103, at least one tag node included in the description information of the web page and not contained in the layout information of the web page is determined as hidden content.

According to an example, at 103, when the layout engine is the webkit, the description information of the web page is the DOM tree and the layout information of the web page is the render tree, if not all tag nodes of the DOM tree are included in the render tree, at least one tag node included in the DOM tree and not contained in the render tree is determined as the hidden content.

The purpose of configuring hidden content in the web page is not to display content to be hidden on the screen after the browser layouts the content. According to the above example, the page is loaded by the layout engine, the description information and layout information of the web page are generated, the description information are compared with the layout information, and thus the method for detecting the hidden content is not affected by the types or encryption, thereby accurately detecting the hidden content and improving accuracy of detecting the hidden content of the web page.

The examples of the present invention also provide a solution for identifying a hidden chain.

In the solution, if the hidden content are tag nodes having a function of pointing to a URL and the tag node having the function of pointing to the URL points to an external link, it is determined that the web page is hung with a hidden chain.

The tag node having the function of pointing to the URL may be: a <a> tag node. The introduction of the <a> tag node are as following.

<a> tag may define an anchor, and the anchor generally has the following two usages.

1. establishing a link or a hyperlink pointing to another document, by using an attribute of a Hypertext Reference (href).

2. establishing a mark inside a document, by using an attribute of a name or an Identifier, that is, establishing a link pointing to a document segment.

In the following example, the layout engine is the webkit, the description information of the web page is the DOM tree and the layout information of the web page is the render tree, and the solutions are described.

In the procedure of rending the web page by using the webkit, a DOM tree and a render tree are constructed in a memory. The DOM tree is used to describe information of a HTML page. The render tree is used to describe the layout of the HTML page, i.e. how to display the DOM tree on the screen. In the procedure of constructing the DOM tree as the render tree, the webkit determines whether each node of the DOM tree is in a hidden state according to a result of parsing the CSS and JavaScript. If the node of the DOM tree is in the hidden state, the node is not added to the render tree when constructing the render tree.

By comparing the DOM tree and the render tree, many elements included in the DOM tree is not contained in the generated render tree. Therefore, by determining whether the nodes included in the DOM tree is the same as the nodes included in the render tree, whether the web page has hidden content is determined. Then whether the <a> tag node is included in the hidden content is determined to further determine whether a link is hidden.

Figure 2:
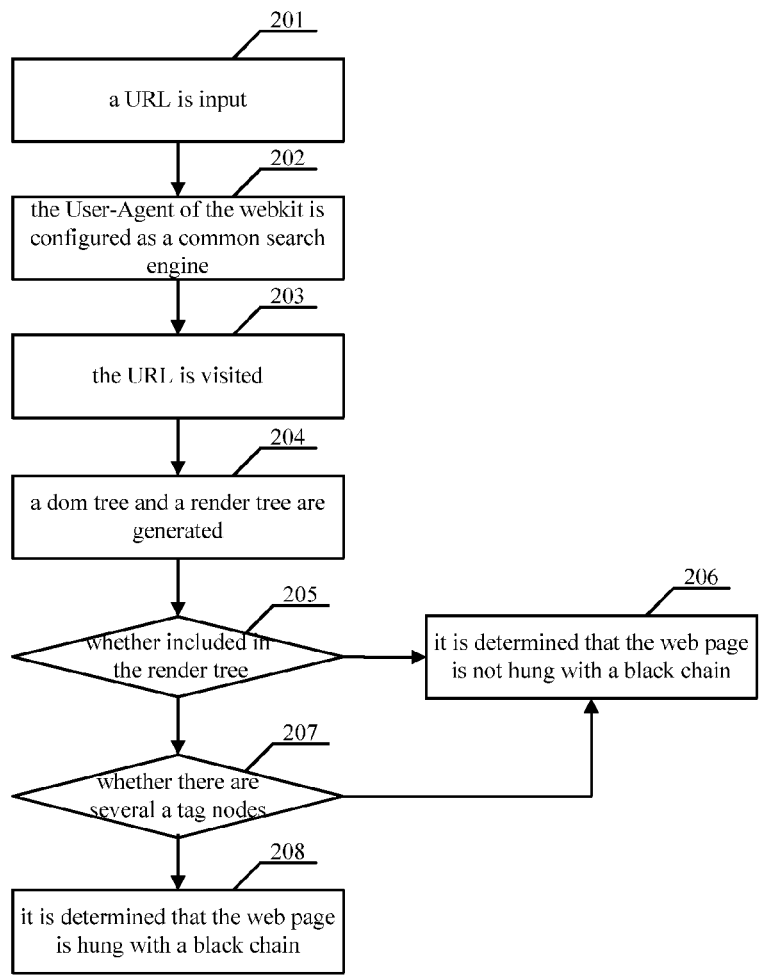
FIG. 2 is a schematic flowchart illustrating a method for detecting hidden content of a web page according to various examples of the present invention.

As shown in FIG. 2, the procedure includes the following processing.

At 201, a URL is input.

At 202, the User-Agent of the webkit is configured as a common search engine.

At 203, the URL is visited. Specifically, the URL is loaded by using the webkit, a returned HTML code is parsed, and other elements of a web page, e.g. CSS, JavaScript are loaded. A time period is taken to wait for completing the execution of the JavaScript, e.g. the time period may be 5 second. The time period may be configured flexibly according to various examples.

At 204, a DOM tree and a render tree are generated.

At 205, it is determined whether all HTML tag nodes included in the DOM tree are included in the render tree. If all HTML tag nodes included in the DOM tree are included in the render tree, processing at 206 is performed. If not all HTML tag nodes included in the DOM tree are included in the render tree, it is indicated that a tag node of the DOM tree is hidden, and processing at 207 is performed.

At 206, it is determined that the web page is not hung with a hidden chain.

At 207, it is determined whether there are several <a> tag nodes in the hidden tag nodes of the DOM tree. If there are several <a> tag nodes in the hidden tag nodes of the DOM tree, processing at 208 is performed; if there is no a tag node in the hidden nodes of the DOM tree, processing at 206 is performed.

At 208, it is determined that the web page is hung with a hidden chain.

It should be noted that, many languages may be used for editing web pages, various languages have different characteristics, and different modes for hiding content are used. In the examples of the present invention, the HTML, CSS, JavaScript are taken as examples and are used to limit the scope of the present invention.

Examples of the present application also provide an apparatus for detecting hidden content of a web page. The apparatus may be located in a terminal device, e.g. a PC, a mobile terminal and etc.

Figure 3:
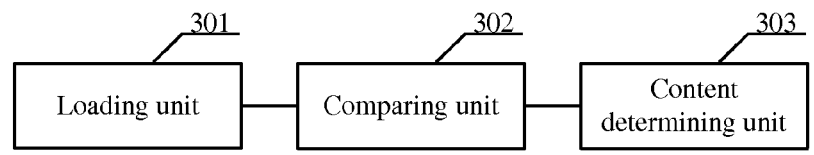
FIG. 3 is a schematic diagram illustrating a structure of an apparatus for detecting hidden content of a web page according to various examples of the present invention.

FIG. 3 is a schematic diagram illustrating a structure of an apparatus for detecting hidden content of a web page according to various examples of the present invention. As shown in FIG. 3, the apparatus includes a loading unit 301, a comparing unit 302 and a content determining unit 303.

The loading unit 301 is to generate description information of a web page and layout information of the web page, by loading the web page.

The comparing unit 302 is to compare the description information of the web page with the layout information of the web page, and determine whether all tag nodes included in the description information of the web page are included in the layout information of the web page.

The content determining unit 303 is to determine at least one tag node included in the description information of the web page and not contained in the layout information of the web page as hidden content, when the comparing unit determines that not all tag nodes included in the description information of the web page are included in the layout information of the web page.

The purpose of configuring hidden content in the web page is not to display content to be hidden on the screen after the browser layouts the content. According to the above example, the page is loaded by the layout engine, the description information and layout information of the web page are generated, the description information are compared with the layout information, and thus the method for detecting the hidden content is not affected by the types or encryption, thereby accurately detecting the hidden content and improving accuracy of detecting the hidden content of the web page.

According to an example, the comparing unit is to, after generating the description information of the web page and the layout information of the web page and a preset delay time period expires, compare the description information of the web page with the layout information of the web page, determine whether all tag nodes included in the description information of the web page are included in the layout information of the web page.

Figure 4:
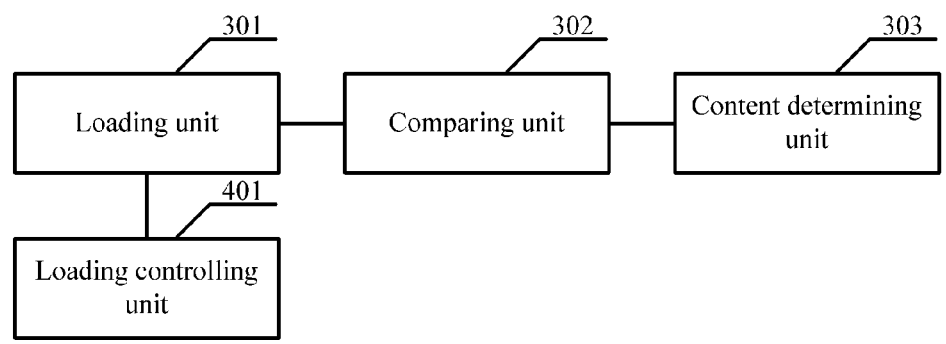
FIG. 4 is a schematic diagram illustrating a structure of an apparatus for detecting hidden content of a web page according to various examples of the present invention.
Figure 5:
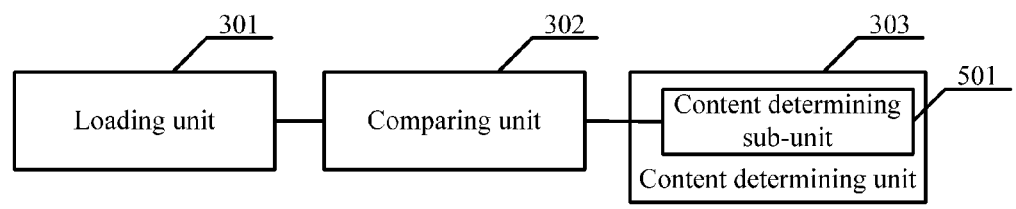
FIG. 5 is a schematic diagram illustrating a structure of an apparatus for detecting hidden content of a web page according to various examples of the present invention.

Moreover, as shown in FIG. 4, the loading unit 301 is further to load the web page by using the webkit. The apparatus further comprises a loading controlling unit 401.

The loading controlling unit 401 is to, before loading the web page by using the layout engine, configure a user-agent of the layout engine as a search engine.

Many hackers determine whether a web page is visited by a common user or by a search engine crawler according to the user-agent. The hacker only returns a page with SEO to the search engine crawler, and returns normal content to the common user, and thus it is different for network managers to detect abnormal states of the web site. According to the example, when the user-agent of the layout engine is configured as the search engine, the above problem is solved, thereby further improving the accuracy of detecting the hidden content of the web page.

According to an example, the loading unit 301 is to load a URL by using the layout engine, parse returned HTML codes, and load other elements in a page corresponding to the returned HTML codes. The other elements include CSS, JavaScript and etc., which is not limited in the example of the present application.

According to an example, the load unit 301 is to load the web page by using a webkit and generate a DOM tree and a render tree.

The comparing unit 302 is to compare the DOM tree with the render tree, determine whether all tag nodes included in the DOM tree are included in the render tree.

The content determining unit 303 is to determine at least one tag node included in the DOM tree and not contained in the render tree as the hidden content, when the comparing unit 302 determines that not all tag nodes included in the DOM tree are included in the render tree.

It should be noted that, the layout engine is a tool for configuring the layout of the web page and is not limited in webkit according to various examples. Similarly, according to various examples, the description information and the layout information are not limited to the DOM tree and the render tree respectively.

According to an example, a solution for identifying a black link is provided. As shown FIG. 5, the apparatus includes a content determining sub-unit 501.

The content determining sub-unit 501 is to determine that the web page is hung with a hidden chain, if the hidden content are tag nodes having a function of pointing to a URL and the tag node having the function of pointing to the URL points to an external link.

It should be noted that, in the above examples, the units are divided according logic functions.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in storage in an extension board inserted in the computer or in storage in an extension unit connected to the computer. In this example, a CPU in the extension board or the extension unit executes at least part of the operations according to the instructions based on the program codes to realize a technical scheme of any of the above examples.

Figure 6:
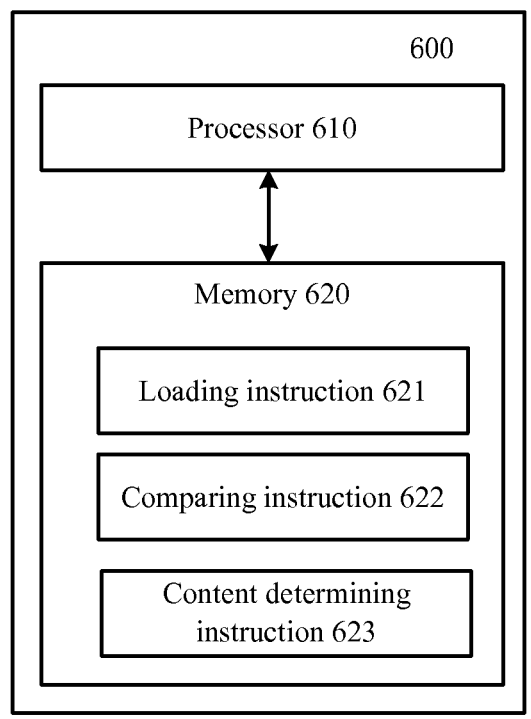
FIG. 6 is a schematic diagram illustrating a structure of a device for detecting hidden content of a web page according to various examples of the present invention.

FIG. 6 is a schematic diagram illustrating a structure of a device 600 for detecting hidden content of a web page according to various examples of the present invention.

As shown in FIG. 6, the device 600 may include a memory 620, and a processor 610 in communication with memory 620. Memory 620 may store the following instructions executable by processor 610, which are a loading instruction 621, a comparing instruction 622 and a content determining instruction 623.

The loading instruction 621 indicates to generate description information of a web page and layout information of the web page, by loading the web page.

The comparing instruction 622 indicates to compare the description information of the web page with the layout information of the web page, and determine whether all tag nodes included in the description information of the web page are included in the layout information of the web page.

The content determining instruction 623 indicates to determine at least one tag node included in the description information of the web page and not contained in the layout information of the web page as hidden content, when the comparing unit determines that not all tag nodes included in the description information of the web page are included in the layout information of the web page.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method for detecting hidden content of a web page, comprising:
    configuring a user-agent character string of a layout engine as a search engine;
    loading a web page by using the layout engine, wherein the layout engine is a tool for configuring a layout of the web page;
    generating description information of the web page by the layout engine, the description information of the web page comprising first tag nodes, wherein the description information of the web page is a Document Object Model (DOM) tree;
    generating layout information of the web page by the layout engine, the layout information of the web page comprising second tag nodes, the second tag nodes not having a hidden state, wherein the layout information of the web page is a render tree;
    comparing, by the layout engine, the description information of the web page with the layout information of the web page to determine whether the layout information of the web page comprises all of the first tag nodes;
    determining, by the layout engine, at least one of the first tag nodes, not being comprised in the layout information of the web page, as hidden content; and
    determining whether the web page is with a hidden link according to the hidden content, wherein determining whether the web page is with the hidden link comprises:
    if the hidden content is a tag node having a function of pointing to a Uniform/Universal Resource Locator (URL), and the tag node having the function of pointing to the URL points to an external link, determining that the web page is with the hidden link.

2. The method of claim 1, wherein comparing by the layout engine the description information of the web page with the layout information of the web page comprises:
    after a preset delay time period expires, comparing, by the layout engine, the description information of the web page with the layout information of the web page to determine whether the layout information of the web page comprises all of the first tag nodes.

3. The method of claim 1, wherein loading the web page by using the layout engine comprises:
    loading a Uniform/Universal Resource Locator (URL) by using the layout engine; receiving and parsing Hypertext Markup Language (HTML) codes; and loading other elements in the web page corresponding to the received HTML codes.

4. The method of claim 1, wherein the layout engine is an open-source browser layout engine; comparing the description information of the web page with the layout information of the web page comprises: comparing the DOM tree with the render tree to determine whether the render tree comprises all of the first tag nodes;
    wherein determining at least one of the first tag nodes, not being comprised in the layout information of the web page, as hidden content comprises: determining at least one of the first tag nodes, not being comprised in the render tree, as hidden content.

5. An apparatus for detecting hidden content of a web page, comprising a memory and a processor communicating with the memory, the memory being configured to store instructions that when executed by the processor configure the system to:
    configure a user-agent character string of a layout engine as a search engine;
    load a web page by using the layout engine, wherein the layout engine is a tool for configuring a layout of the web page;
    generate description information of the web page by the layout engine, the description information of the web page comprising first tag nodes, and generate layout information of the web page by the layout engine, the layout information of the web page comprising second tag nodes, the second tag nodes not having a hidden state, wherein the description information of the web page is a Document Object Model (DOM) tree; and the layout information of the web page is a render tree;
    compare, by the layout engine, the description information of the web page with the layout information of the web page to determine whether the layout information of the web page comprises all of the first tag nodes;

determine, by the layout engine, at least one of the first tag nodes, not being comprised in the layout information of the web page, as hidden content; and, determine, by the layout engine, whether the web page is with a hidden link according to the hidden content, wherein determining whether the web page is with the hidden link comprises:

if the hidden content is a tag node having a function of pointing to a Uniform/Universal Resource Locator (URL), and the tag node having the function of pointing to the URL points to an external link, determining that the web page is with the hidden link.

6. The apparatus of claim 5, wherein when being executed by the processor, the instructions further configure the apparatus to:

after a preset delay time period expires, compare, by the layout engine, the description information of the web page with the layout information of the web page to determine whether the layout information of the web page comprises all of the first tag nodes.

7. The apparatus of claim 5, wherein when being executed by the processor, the instructions further configure the apparatus to:

load a Uniform/Universal Resource Locator (URL) by using the layout engine; receive and parse returned HTML codes; and load other elements in a web page corresponding to the received HTML code.

8. The apparatus of claim 5, wherein when being executed by the processor, the instructions further configure the apparatus to:

load the web page by using an open-source browser layout engine, generate the DOM tree and the render tree;

compare the DOM tree with the render tree to determine whether the render tree comprises all of the first tag nodes;

determine at least one of the first tag nodes, not being comprised in the render tree, as hidden content, when determining that the render tree does not comprise all of the first tag nodes comprised in the DOM tree.

\* \* \* \* \*